Jan. 6, 1959  A. HEINZERLING  2,867,419
BEATING DEVICE FOR HOUSEHOLD PURPOSES
Filed Feb. 24, 1956  4 Sheets-Sheet 3

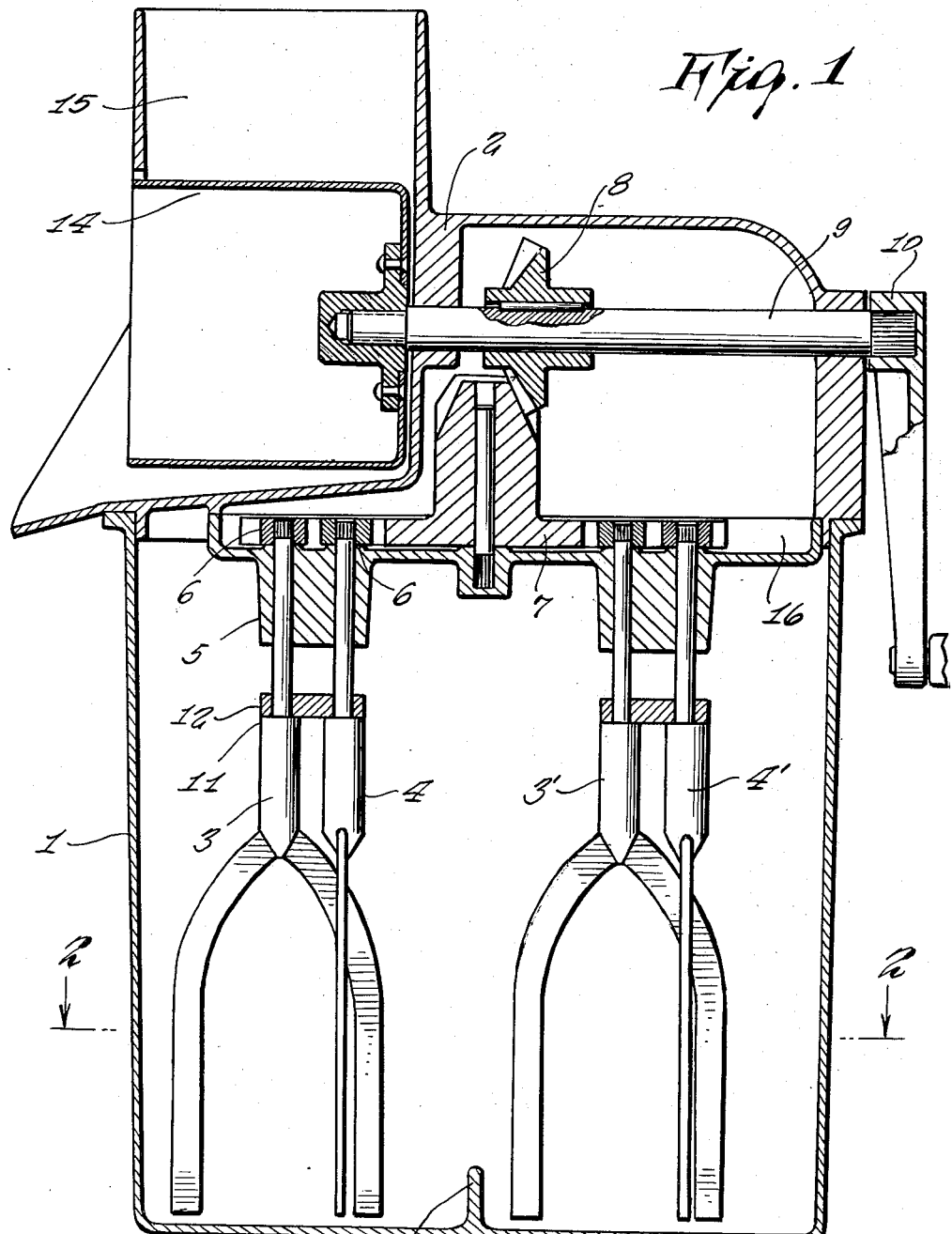

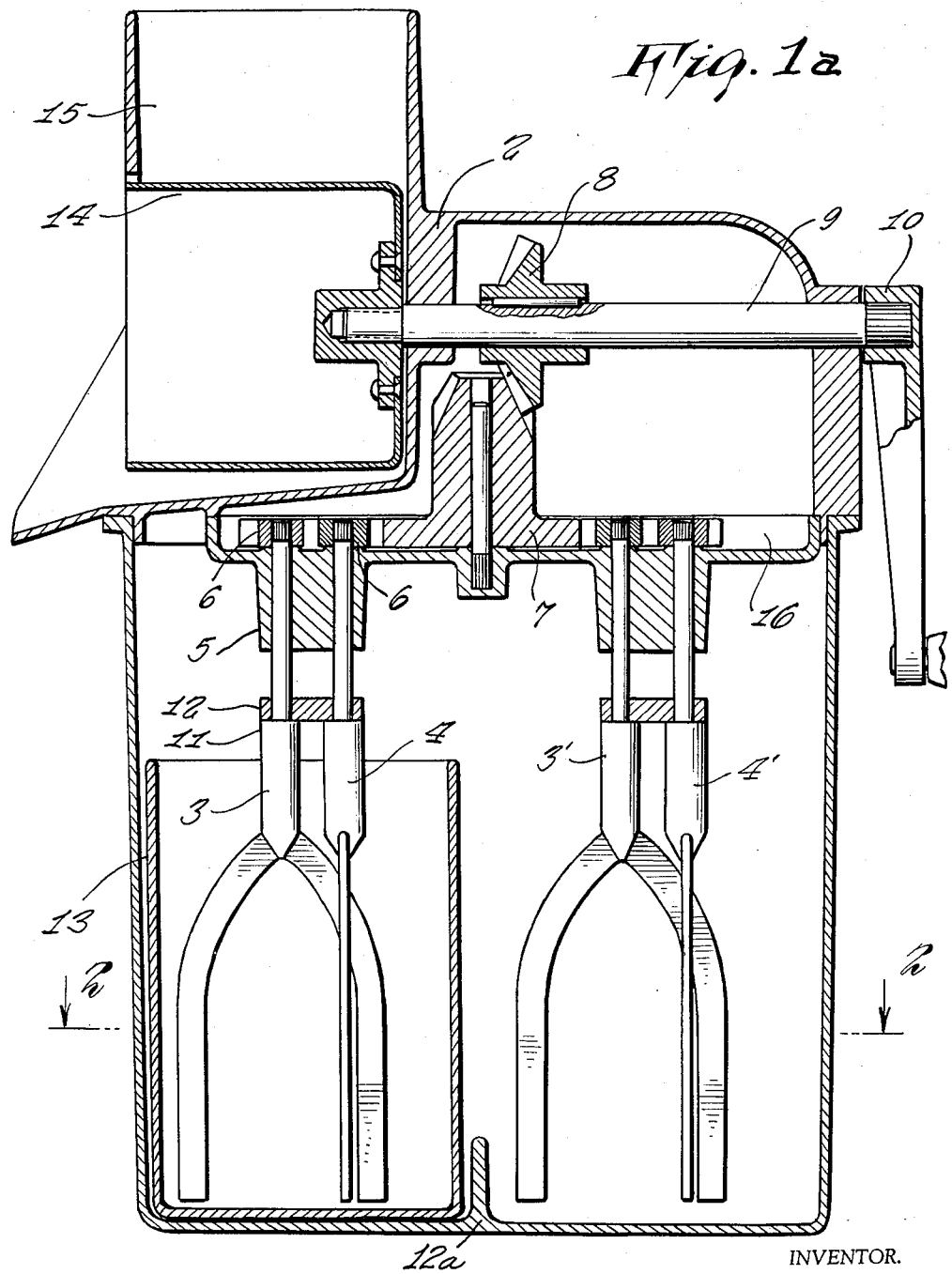

INVENTOR:

United States Patent Office 2,867,419
Patented Jan. 6, 1959

2,867,419
BEATING DEVICE FOR HOUSEHOLD PURPOSES

August Heinzerling, Altmorschen, Bezirk Kassel, Germany

Application February 24, 1956, Serial No. 567,571

Claims priority, application Germany February 26, 1955

1 Claim. (Cl. 259—64)

The present invention relates to a beating device for household purposes which can be combined with some other device e. g. a grinding device if desired, so as to make it serve different purposes.

Beating devices with a pair of fork-shaped beaters are already known having closely adjacent shafts; upon rotation of the shafts in opposite directions, the beaters intermesh with their ends so as to form, by their overlapping, a single circle of rotation.

Furthermore, a beating device for household purposes is also known which is provided with a rotating disk having laterally to its axis of rotation two pairs of counter-rotating beaters intermeshing with their fork-shaped elements. In this case the pairs of beaters form two circles of operation which upon rotation of the disk are likewise rotated in a circle. The beater driving mechanism is arranged on a lid which can be placed on a vessel onto which it fits. Such devices have proved their usefullness in practice and have a wide acclaim, since they permit to achieve a beating action not easily accomplished with other devices.

However, the last mentioned devices have the disadvantage that the rotating disk below the lid, which carries the two eccentrically arranged pairs of beaters, has a comparatively large surface to be sealed, which leads to difficulties. The use of lubricants for the beater driving mechanism should be avoided or applied with utmost care because the oil might mix with the goods to be stirred. On the other hand, these goods enter the beater driving mechanism comparatively easily. This makes necessary a careful cleaning of every single part of the mechanism, a fact which is very awkward in practical use and which is often neglected. This is not only a source of uncleanliness, but causes considerable wear of the stirring mechanism which detracts from its useful life, particularly when the parts are made from pressed material.

The present invention relates to a beating device which avoids the above named disadvantages while providing at least equally good beating effects and has some further advantages which will become apparent from the detailed specification.

According to the invention, the beating device is driven by a beater driving mechanism which is preferably housed in a part of the lid of the vessel. Two beaters are arranged with their rotational axes spaced apart at such a distance that there will be no overlapping of the circles of rotation. Instead of single beaters, double beaters known in the art can be used, each pair having closely adjacent shafts forming by intermeshing of the two beaters a single circle of rotation and stirring action; all axes of the beaters lie preferably in the same longitudinal direction. Consequently, with the above arrangement two individual circles of beating actions will be formed, which would not interfere considerably with each other in a cylindrical vessel. In order to combine the action of the two, so to speak stationary, stirring circles, it is another feature of the invention to make the vessel with walls shaped to conform with the two circles, the whole vessel being preferably of oval shape with the walls between the two circles slightly drawn in. It is thereby accomplished that the actions of the two stirring circles will become combined.

It is also possible to provide several pairs of beaters or several single beaters to be used in a vessel appropriately shaped instead of the beater arrangement with two single beaters or two double beaters, and to provide several zones of drawn-in walls in the vessel.

In one embodiment of the device according to the invention comprising two pairs of beaters, the drive for these pairs of beaters is so devised that the two inside beaters are moved in the same sense of rotation whereby they perform a counter-movement at their approach. By this arrangement the goods to be beaten are cut up in this zone and the effectiveness of the stirring device is enhanced. The arrangement of the beaters in laterally juxtaposed position which entails a broadening of the vessel and invites the oval design, favors at the same time the use of a manual crank on a transverse shaft; this is an improvement as compared to the conventional drive with vertical axes of rotation, because it makes holding of the device easier.

In a further embodiment of the device according to the invention, another device is combined with the device, for instance a grinder, a cutter, or the like. If a grinder is used, it is secured to the transverse shaft of the manual crank, a gear for engagement or disengagement of the beater driving mechanism being likewise provided.

The device according to the invention will now be more fully described with reference to the accompanying drawings, but it should be understood that these are given by way of illustration and not of limitation, and that many changes in the details can be made without departing from the spirit of the invention.

In the drawings:

Fig. 1 is a vertical cross-section of the device according to the invention.

Fig. 1a shows the device of Fig. 1 and a container inserted therein.

Figure 3:
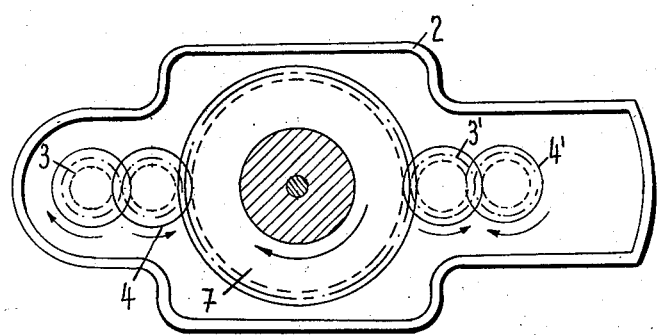

Fig. 3 diagrammatically illustrates the gear arrangement of the beater driving mechanism.

Figure 4:
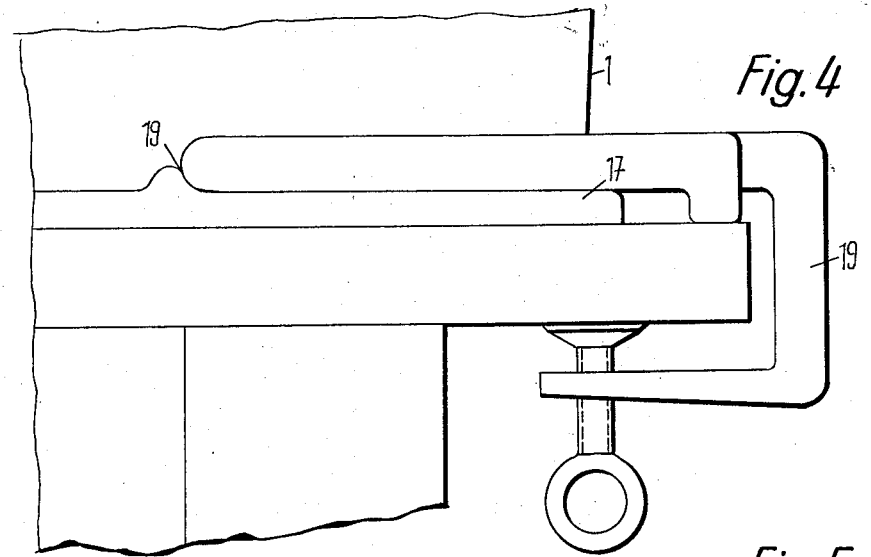
Figure 5:
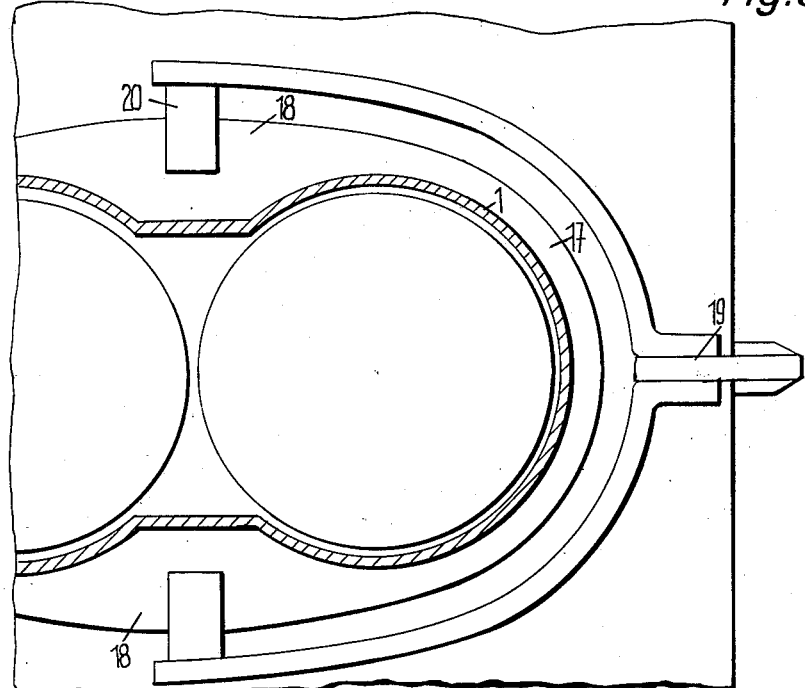

Fig. 4 is a vertical partial section of the lower part of the vessel as attached to a work table, and Fig. 5 a transverse section thereof.

Figure 2:
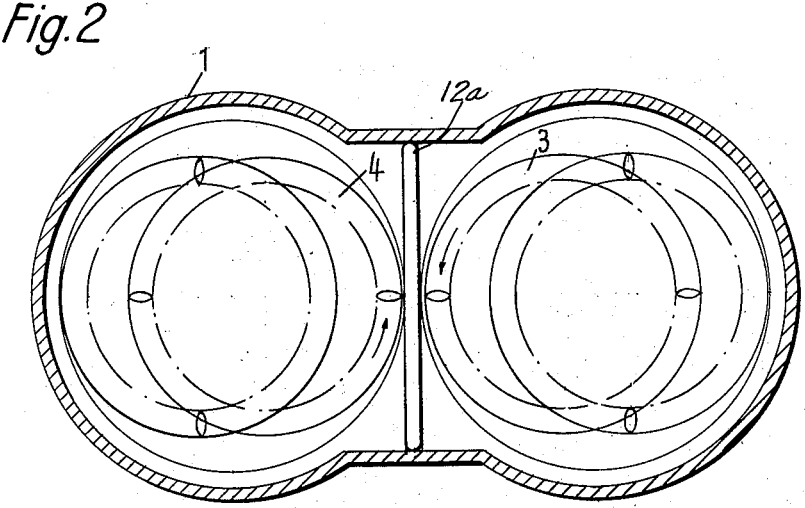
Fig. 2 is a section along line 2—2 of Fig. 1, illustrating the beaters in transverse section.

Referring now to Figs. 1-3, the vessel is designated by 1, the lid therefor, housing at the same time the beater driving mechanism by 2. Attached to the lid are members 5 with downward projections serving as bearings for two pairs of beaters, 3, 4, and 3' and 4', which are connected at the upper ends of their shafts with gears 6, capable of rotating each pair of beaters in opposite directions. A common drive gear 7 operates both gears 6, and the former is in turn driven by a main gear 8 mounted on a horizontal shaft 9, operated by a manual crank 10.

As shown in Fig. 3, the two inside beaters 4 and 3' are driven in the same direction which makes for a counter movement of the two beaters in the zone of approach (see arrows in Fig. 2).

As more clearly seen from Fig. 1, there is no connection between the vessel and the space in which the beater driving mechanism is housed, except for the small passages for the shafts 3 and 4 in members 5 with their comparatively narrow bores which can be easily sealed. Consequently, the possibility of the beater driving mechanism becoming soiled is minimized and on the other hand the emerging of lubricant into the goods to be mixed is practically nil.

As may be further seen from Fig. 1, the shafts of the beaters are provided with a shoulder 11 on which shoulder a washer 12 is loosely placed. This washer forms a spacing disk which is at a certain distance of the bearing, provides smooth running of the beaters and will on the other hand prevent, to a certain extent, a seeping-through of liquid at the shafts. It also makes for easy cleaning of the beaters at this point.

Fig. 1 further shows that the vessel is provided at the bottom with an upstanding projection 12a thereby forming a partition by which the vessel is divided into two compartments. The partition may be of any desired height. The advantages of the partition are that it is possible to use one of the two beaters only for stirring smaller quantities, or to have in both compartments small quantities of different mixtures which can then be combined later on.

The arrangement of the two pairs of beaters makes it also possible to insert for one or both pairs small containers as indicated at 13 in the left-hand part of Fig 1a, where an individual mixture can be separately prepared.

Fig. 1 shows an embodiment, in which a grinder is combined with the beater, but it should be understood that this is given by way of example only. In this case a grinding drum 14 is secured to the shaft 9 for the manual crank, the casing having to be appropriately shaped for this purpose. A hopper 15 is provided for feeding-in the goods to be ground. The grinding drum 14 is always rotated when the crank 10 is operated, whereas gear 8 can be engaged or disengaged as desired, so that the action of the beaters may be discontinued at will. The movement of the grinding drum, even without charge, does not amount to an additional load, whereas it would mean a further requirement of power and additional wear if the beating device would also be operating while idling.

In the lid next to the wall enclosing shaft 9 there are pocket-shaped openings 16 for dropping in or filling-in goods to be stirred or to make other additions.

The shape of the container is seen from Fig. 2. There it is shown that the walls between the two beating areas are drawn-in, in order to insure proper movement of the goods under treatment and to prevent the creation of dead spaces.

It should be noted that it is also possible to have several pairs of beaters instead of two, the vessels having then to be appropriately shaped. Instead of using two pairs of beaters it is, of course, possible to use a single beater in each beating zone.

The vessels described above allow a simple attachment of the stirring device, more particularly when the same is also to be used as a grinding device (Figs. 4 and 5).

The bottom 17 of vessel 1 may in this case be of oval shape without being drawn in the center part, so that there will be a free bottom space 18 at each side of the vessel where a yoke-shaped clasp 19 can grip the vessel with the ends 20 of its yoke.

As these two figures show, a simple yet effective fastening device is provided for the beater according to the invention. For the attachment of the lid-shaped upper part which serves for housing the stirring mechanism, the conventional fastening means may be provided, such as tiltable clamps.

What I claim is:

In a beating devise for household purposes including a vessel of substantially oval shape, a lid arranged on said vessel and provided with a beater driving mechanism, in combination, a projection extending vertically and upwardly from the bottom of said vessel, whereby a partition is formed dividing the lower portion of said vessel into two separate compartments for holding predetermined quantities of different mixtures in each of said compartments, respectively, two vertically disposed beaters, spaced from one another, rotably and detachably secured to said driving mechanism, said beaters being vertically aligned with said compartments, so that each beater extends into the compartment with which it is aligned, whereby different mixtures may be stirred in each of said compartments, without intermixing with one another.

References Cited in the file of this patent

UNITED STATES PATENTS

| | | |
|---|---|---|
| 297,518 | Hussey | Aug. 22, 1884 |
| 430,783 | Mulford | June 24, 1890 |
| 856,469 | Kapheim | June 11, 1907 |
| 1,003,425 | Booth | Sept. 19, 1911 |
| 1,071,747 | Hutchinson | Sept. 2, 1913 |
| 1,192,426 | Hudson | July 25, 1916 |
| 2,382,158 | Kennedy | Aug. 14, 1945 |

FOREIGN PATENTS

| | | |
|---|---|---|
| 1,069,108 | France | July 5, 1954 |
| 927,724 | Germany | May 16, 1955 |